A. G. THOMSON.
WHEEL TIRE.
APPLICATION FILED DEC. 23, 1907.

950,416.

Patented Feb. 22, 1910.

WITNESSES:

INVENTOR
Arthur Gal Thomson
BY Lincoln Townly
ATTORNEY

UNITED STATES PATENT OFFICE.

ARTHUR GALE THOMSON, OF SAN FRANCISCO, CALIFORNIA, ASSIGNOR OF ONE-HALF TO ALBERT SUTTON, OF SAN FRANCISCO, CALIFORNIA.

WHEEL-TIRE.

950,416.  Specification of Letters Patent.  Patented Feb. 22, 1910.

Application filed December 23, 1907. Serial No. 408,153.

*To all whom it may concern:*

Be it known that I, ARTHUR GALE THOMSON, a citizen of the United States, residing at San Francisco, in the county of San Francisco and State of California, have invented certain new and useful Improvements in Wheel-Tires, of which the following is a specification.

My invention relates to improvements in wheel tires.

The object of my invention is to provide a wheel tire of metal having increased resiliency, as well as increased strength by improved means of reinforcement, my invention being appropriate for sectional tires.

My invention consists in the novel arrangement and construction of parts shown in the accompanying drawing, described in the following specification and claimed in the appended claims.

Figure 1:
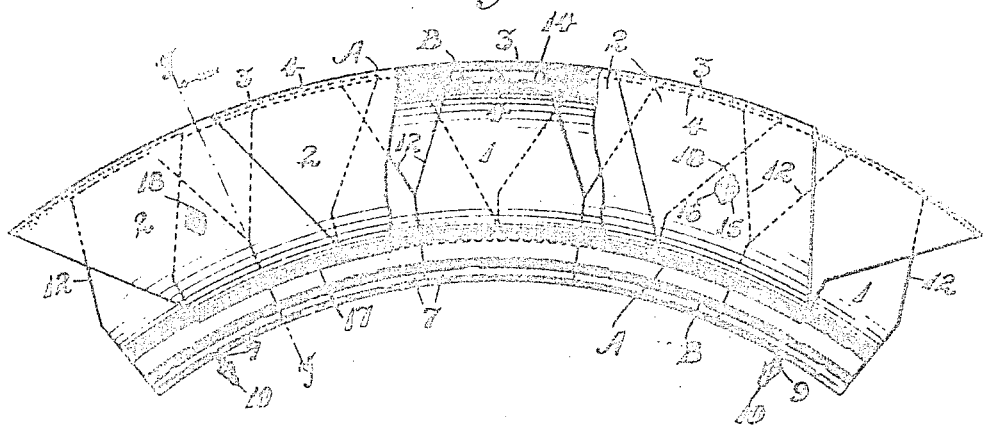
Figure 2:
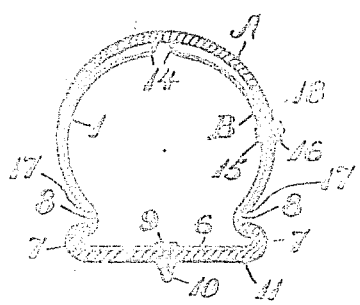

In the drawings Figure 1 represents a section of my wheel tire, partly broken away to show the form of the tire B, the lines extending crosswise from the outer to the inner circumference of the tire and of the outer casing, showing the manner of dividing the wheel tire sectionally, dotted lines denoting the concealed divisions and unbroken lines the exposed divisions. Fig. 2 is a transverse section of my wheel tire taken on line y—y of Fig. 1.

In the figures, 1 shows one of the inner sections that form the tire B, and 2 is one of the outer sections that form the casing A, said casing having the overlapping tongue 3 at one end and at the other end the inner sustaining tongue 4, and said outer casing A has clenching sides 17 to grip the tire B at 8. The tire has a base 6 and spring flanges 7 secured by the rim 11, and it has also the curved ends 14 so that it can be depressed by casing A. The tire is cut away as shown at 12 so that ends 14 will have the most effective resiliency besides effecting a reduction in weight. The tire B is held in place by the bolts 9 and nuts 10 placed at appropriate intervals. The outer casing A is prevented from slipping transversely by means of the bolts 15 and nuts 16 likewise placed. The tongues contact as shown in Fig. 1 and the overlapping tongue of one section engages the inner sustaining tongue of the other section thereby forming when all the sections are joined one continuous casing, designated as A. The tongue 4 is thinner than the tongue 3 so as to increase the resiliency of the casing. The ends of the sections of the casing A are cut at reverse inclines and when the sections are in position the abutting ends prevent movement or mutual approach of the sections after being properly adjusted or positioned.

The form of the tire B as nearing the ends 14 has such curvature as to provide sufficient space between such tire and the casing A for permitting the approach of such ends when pressure is exerted centrally on casing A. Each of the sections of the tire B is of the same size, and they contact evenly at all points except the upper portions which constitute curved teeth having flanges 14 as represented centrally in Fig. 1 and each side of the tire is identical with the view thereof as shown in the said figure. Each section of the casing A is thickest at the central point in its arch and from thence becomes thinner to its ends. The aperture 18 extends through both the tire and the casing and forms a transverse slide to accommodate a guide bolt 15 to maintain the parts in relative position. The flanges 14 have preferably rounded ends so as to prevent wearing the interior of said casing.

Having thus described my invention, what I claim as new and desire to secure by Letters Patent, is:

1. A wheel tire having a plurality of separable, independent, outer, counterpart sections forming a casing inclosing the tire, and a plurality of independent and inner contacting counterpart sections forming the tire, each of the last named sections having depressions in the sides thereof and side flanges at its base inclosed by the rim and having oppositely positioned curved teeth with flanges centrally engaging the interior of the outside casing.

2. A wheel tire having a plurality of separable, outer, counterpart sections having elongated side apertures for securing the same to the tire, said sections telescoping each other and forming a casing for the tire and the sides thereof terminating in depressions in the sides of said tire, and a plurality of independent and inner contacting counterpart sections forming the tire, having inner portions inclosed by the rim and having outer portions provided with oppositely positioned curved teeth with flanges centrally engaging the interior of said casing.

3. A wheel tire having a plurality of separable, outer, counterpart sections having elongated side apertures for securing the same to the tire, said sections telescoping each other and forming a casing for the tire and the sides thereof terminating in depressions in the sides of said tire, a plurality of independent and inner contacting counterpart sections forming the tire, having inner portions inclosed by the rim and having outer portions provided with oppositely positioned curved teeth with flanges centrally engaging the interior of said casing, the outer edges of said teeth edge-wise engaging the interior of the casing.

4. A wheel tire having a plurality of separable, outer counterpart sections having elongated side apertures for securing the same to the tire, said sections telescoping each other and forming a casing for said tire and the sides thereof terminating in depressions in the sides of said tire, and a plurality of independent and inner contacting counterpart sections forming the tire, each of the last-named sections having depressions in the sides thereof and side flanges at its base inclosed by the rim, and having oppositely positioned curved teeth having flanges centrally engaging the interior of said casing.

In testimony whereof I affix my signature, in presence of two witnesses.

ARTHUR GALE THOMSON.

Witnesses:
C. F. GODDARD,
ADDIE L. BALLOU.